US011082886B2

(12) United States Patent
Streijl

(10) Patent No.: US 11,082,886 B2
(45) Date of Patent: Aug. 3, 2021

(54) ENHANCED NETWORK CONGESTION APPLICATION PROGRAMMING INTERFACE

(71) Applicant: AT&T Intellectual Property I, L.P., Atlanta, GA (US)

(72) Inventor: Robert C. Streijl, Brighton, MA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/807,768

(22) Filed: Mar. 3, 2020

(65) Prior Publication Data
US 2020/0236585 A1 Jul. 23, 2020

Related U.S. Application Data

(63) Continuation of application No. 16/289,858, filed on Mar. 1, 2019, now Pat. No. 10,623,985, which is a continuation of application No. 14/534,499, filed on Nov. 6, 2014, now Pat. No. 10,225,761.

(51) Int. Cl.
*H04W 28/02* (2009.01)
*H04W 72/12* (2009.01)
*H04L 12/801* (2013.01)
*H04L 12/721* (2013.01)
*G06F 11/34* (2006.01)

(52) U.S. Cl.
CPC ....... *H04W 28/0289* (2013.01); *H04L 47/127* (2013.01); *H04L 47/29* (2013.01); *H04W 72/1252* (2013.01); *G06F 11/34* (2013.01); *H04L 45/12* (2013.01)

(58) Field of Classification Search
CPC ....... H04W 64/00; H04W 12/02; H04W 4/02; H04W 40/30; H04W 40/32; H04W 48/20; H04W 4/025; H04W 4/043; H04W 84/18; H04W 8/26
See application file for complete search history.

(56) References Cited

U.S. PATENT DOCUMENTS

| 5,399,976 A | 3/1995 | Wardle |
| 6,272,539 B1 | 8/2001 | Cuomo et al. |
| 7,103,024 B2 | 9/2006 | Wilson |

(Continued)

FOREIGN PATENT DOCUMENTS

EP 2 725 752 A1 4/2014

OTHER PUBLICATIONS

Non-Final Office Action received for U.S. Appl. No. 14/534,499 dated Mar. 30, 2016, 30 pages.

(Continued)

*Primary Examiner* — Natasha W Cosme
(74) *Attorney, Agent, or Firm* — Amin, Turocy & Watson, LLP

(57) ABSTRACT

Reception of network load data is disclosed. For instance, the network load data can provide indication of a utilization level extant in a wireless cellular network. The systems and methods, as a function of the utilization level, determine a congestion metric that indicates a level of congestion determined to have been experienced by a communication packet using the wireless cellular network device. Further, the disclosed systems and methods schedules transmission of communication packets to an end user device via the wireless cellular network device, as a function of the determined congestion metric.

20 Claims, 10 Drawing Sheets

(56) References Cited

U.S. PATENT DOCUMENTS

| | | | |
|---|---|---|---|
| 7,190,670 | B2 | 3/2007 | Varsa et al. |
| 7,468,945 | B2 | 12/2008 | Enomoto et al. |
| 7,633,940 | B1 | 12/2009 | Singh et al. |
| 7,768,917 | B2 | 8/2010 | Nakayama et al. |
| 7,802,002 | B2 | 9/2010 | Wee et al. |
| 7,813,351 | B2 | 10/2010 | Shriram et al. |
| 7,970,011 | B2 | 6/2011 | Carlson et al. |
| 7,983,156 | B1 | 7/2011 | Papirakis |
| 8,149,696 | B2 | 4/2012 | Santhanankrishnan |
| 8,189,479 | B1 | 5/2012 | Doherty et al. |
| 8,326,992 | B2 | 12/2012 | Luzzatti et al. |
| 8,422,367 | B2 | 4/2013 | Chen et al. |
| 8,755,396 | B2 | 6/2014 | Sindhu et al. |
| 9,665,703 | B2 | 5/2017 | Turgeman et al. |
| 2002/0193118 | A1 | 12/2002 | Jain et al. |
| 2007/0189167 | A1 | 8/2007 | Miceli |
| 2009/0198830 | A1 | 8/2009 | Zhang et al. |
| 2010/0161761 | A1 | 6/2010 | Yu et al. |
| 2011/0131307 | A1 | 6/2011 | El Bazzal et al. |
| 2012/0020216 | A1 | 1/2012 | Vashist et al. |
| 2013/0100810 | A1 | 4/2013 | Slothouber |
| 2013/0114448 | A1 | 5/2013 | Koo |
| 2013/0182568 | A1 | 7/2013 | Lee et al. |
| 2013/0223219 | A1 | 8/2013 | Mir et al. |
| 2013/0246649 | A1 | 9/2013 | Zolfaghari et al. |
| 2013/0286837 | A1 | 10/2013 | Khanchi et al. |
| 2013/0329552 | A1 | 12/2013 | Carnero Ros et al. |
| 2015/0043346 | A1 | 2/2015 | Miller et al. |
| 2015/0332145 | A1 | 11/2015 | Vasseur et al. |

OTHER PUBLICATIONS

Final Office Action received for U.S. Appl. No. 14/534,499 dated Oct. 27, 2016, 27 pages.
Non-Final Office Action received for U.S. Appl. No. 14/534,499 dated Feb. 23, 2017, 25 pages.
Final Office Action received for U.S. Appl. No. 14/534,499 dated Jun. 7, 2017, 26 pages.
Non-Final Office Action received for U.S. Appl. No. 14/534,499 dated Oct. 17, 2017, 22 pages.
Non-Final Office Action received for U.S. Appl. No. 14/534,499 dated May 24, 2018, 23 pages.
Karenos et al., "Cluster-based Congestion Control for Sensor Networks", ACM Transactions on Sensor Network, 2007, pp. 1-32.
Chen et al., "QoS-Aware Virtual Machine Scheduling for Video Streaming Services in Multi-Cloud", Tsinghua Science and Technology, ISSN, vol. 18, No. 3, Jun. 2013, pp. 308-317.
Fall, Kevin., "A Delay-Tolerant Network Architecture for Challenged Internets", Intel Research Technical, SIGCOMM'03, Aug. 25-29, 2003 8 pages.
Li et al., "Jitter Based Delay Boundary Prediction of Wide-Area Networks", Philips Research, May 25, 2001, pp. 1-14.
Suárez, E. M. Macias y A., "Proactive Estimation of the Video Streaming Reception Quality in WiFi Using a Cross-Layer Technique", IEEE Latin America Transactions, vol. 7, No. 3, Jul. 2009, pp. 383-389.
Rizo-Dominguez et al., "RTT Prediction in Heavy Tailed Networks", IEEE Communications Letters, vol. 18, No. 4, Apr. 2014, pp. 700-703.
Yuan et al., "Predict and Relay: An Efficient Routing in Disruption-Tolerant Networks", MobiHoc '09, May 18-21, 2009, 10 pages.
Non-Final Office Action received for U.S. Appl. No. 16/289,858 dated Aug. 22, 2019, 29 pages.

ENHANCED NETWORK CONGESTION APPLICATION PROGRAMMING INTERFACE

RELATED APPLICATION

The subject patent application is a continuation of, and claims priority to each of, U.S. patent application Ser. No. 16/289,858, filed Mar. 1, 2019, and entitled "ENHANCED NETWORK CONGESTION APPLICATION PROGRAMMING INTERFACE," which is a continuation of U.S. patent application Ser. No. 14/534,499 (now U.S. Pat. No. 10,225,761), filed Nov. 6, 2014, and entitled "ENHANCED NETWORK CONGESTION APPLICATION PROGRAMMING INTERFACE," the entireties of which applications are hereby expressly incorporated by reference herein.

TECHNICAL FIELD

The disclosed subject matter relates to the provision of network functionality metrics via network application programming interfaces (APIs) to invoking applications.

BACKGROUND

Delivery of multimedia content from/between/to mobile wireless cellular endpoint devices and/or server devices has become prevalent in the present age. One issue that can affect user experience in regard to receiving and/or transmitting multimedia content over a mobile cellular network in a continuous stream of network communication packets can be network congestion associated with the mobile cellular network. Such network congestion and/or overutilization can cause streams of network communication packets transmitted from first endpoint devices to be delayed, causing what should be a seamless and/or ordered stream of network communication packets to be received at receiving endpoint devices as discontinuous and/or disordered packet streams causing quality of service issues and consequently end user dissatisfaction.

DETAILED DESCRIPTION

Figure 1:
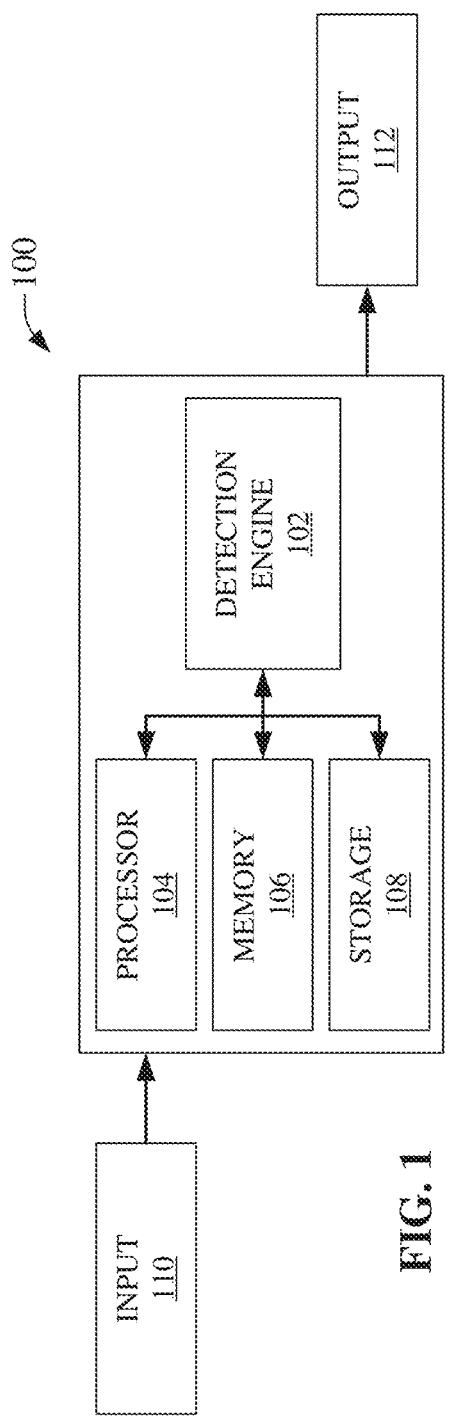
FIG. 1 is an illustration of a system for scheduling transmission of streams of transmission packets between/from/to various devices in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

One category of application programming interfaces (APIs) are network informational APIs that provide calling/invoking applications with network related information that can cause and/or facilitate the calling/invoking application to adjust or change their service behavior(s) to achieve the best possible user experience for end-user(s). One such API can be a network load API, sometimes referred to as a congestion API, which in the context of mobile wireless networks, typically can provide indication of network conditions related to cell/sector load/utilization, and based at least in part on these indications, a calling/invoking application can in one instance, for example, dynamically and/or automatically change (e.g., reduce or enlarge) the size of transmitted content (e.g., by modifying the size of the entire file) scheduled to be transmitted over the wireless cellular network depending on whether or not the network load API has indicated that the wireless cellular network is experiencing a high level of congestion.

For example, if the wireless cellular network (or a cell/sector thereof) has entered a high load/congestion state, the network load API can provide indication to an calling application (e.g., an application that places a premium on the real-time service of communication packets, such as a video streaming server application) that network congestion levels are such that the calling application should, as a function of the indicated high congestion state, reduce the size of the transmitted content (e.g., by transcoding (or re-transcoding) the content based on congestion state) employed to transmit the video stream to a video streaming client operational on an end user device (e.g., smart phones, tablet computers, laptop computers, notebook computers, desktop computers, server class computing devices with or without wired and/or wireless capabilities, electronic devices inclusive of processors and/or memories, consumer and/or commercial wired/ wireless devices, industrial wired and/or wireless equipment, avionics components, and the like). Such reductions in the size of transcoded (or re-transcoded) and/or transmitted content in the context of the foregoing example can ensure that the video stream is provided to the end user device in a timely fashion thereby ensuring that end user expectations are not deleteriously affected. In a similar vein and in continuation of the foregoing example, when network congestion is low or negligible the network load API can provide indication to an invoking process (e.g., video streaming server application) that network congestion is currently low and that the invoking process could possibly increase the overall size of the content utilized to fulfill video streaming requests emanating from the video streaming client operational on the end-user device.

Additionally and/or alternatively, and once again in the context of the foregoing illustration, when a video streaming server application is provided indication by a network load API that network congestion is in a high load/congestion state, the video streaming server application can, for instance, reduce the resolution with which the streaming content is delivered and/or reduce the picture size of the video content that will be delivered to the video streaming client executing on the end-user device. Thus, while an end user may experience marginally degraded picture quality and/or smaller picture sizes associated with the video stream, the continuity of the video stream can be preserved and all communication packets within which the video stream is included can be assured of timely delivery to the end-user device and subsequent display by the video stream client.

As will be appreciated by those of ordinary skill, the foregoing example pertains to situations where communication exchanges need to be in real time or in near contemporaneity. In instances where communication exchanges do not need to be in real time, invoking applications, based at least on, or as a function of, indications from a network load API can delay their transactions; this is sometimes referred to as "time shifting".

A load indication as generated by a network load/congestion API is typically an average utilization/load level reported over a defined period of time. The classic network load indicator API provides an indication in terms of some load or utilization level. This utilization level can be represented, for example, as a numeric value on a scale of 0-100%, or as a mnemonic such as High, Medium, Low.

In the context of a network load/congestion API, a load indicator is expected to be used just prior to a communication, so a load indication provided by a network load/congestion API would be most useful if it were to include a prediction related to the expected congestion that a communication packet transmitted between two communication end-point network devices could potentially encounter in a defined or determinable prospective period of time. To date, most network load/congestion APIs have been backward looking, concerned mainly with past events; concerned with how congested a wireless communication network was in the (recent and/or distant) past.

Generally, a mobile wireless cellular network (or more specifically the air interface of the mobile wireless cellular network) can be expected to show frequent varying load conditions. Some of these load conditions can be so high that they can lead to congestion in the network. When these periods of high load conditions or congestion are short and/or are sufficiently intermittent, most reliant applications have sufficient onboard protocols/processes to provide the elasticity to ameliorate such congestion events and to ensure a satisfactory service experience for end users. However, when periods of high load conditions or congestion become significantly longer, the onboard ameliorative protocols can become ineffective which can result in end-users experiencing, at best, slower reaction times and a diminished service experience. For many applications that are not reliant on transmission of time critical (real time) communication packets over the mobile wireless cellular network, long durations of network congestion can be inconsequential and not of vital importance. Applications, such as streaming applications (e.g., applications that rely on the transmission of a continuous stream of content included in transmitted communication packets, such as video streaming applications), that can be dependent on the real time, or near contemporaneous, ordered or sequential delivery of transmitted content containing communication packets can be particularly susceptible to varying and long duration network congestion. Applications of the latter sort could certainly benefit from knowing more than the average network utilization currently extant in the mobile wireless cellular network, in particular, such applications could benefit from knowing in real time the network utilization for an entire prospective duration in which a stream of content is to be transmitted in a continuous stream of transmission packets to an end user device, be that defined or definable prospective duration merely last 6 seconds for a brief video clip, the duration for the playing of a feature length film, or the entire broadcast of a sporting event. Nevertheless, in these situations it will be appreciated that longer communications of longer durations will typically encounter more varying and disparate load levels.

In accordance with the foregoing, the subject disclosure describes a network load API or a congestion API that includes an indication as to whether an observed and reported utilization interval has a plethora of long duration congestion events. As has been observed, long duration congestion events are currently not reported by network load/congestion APIs. Indicators that provide identification as to whether or not a plurality of long duration congestion events within a defined or definable time period have occurred can be beneficial for applications that need to stream content in continuous streams of successive transmission packets to an end user device. Such indicators can permit these applications to better cope with the disruptive effects long period congestion events can have on streams of transmission packets transmitted, from a server device to an end user device, that need to be received by the end user device in an ordered succession (e.g., the first packet transmitted by the server device to the end user device needs to be received by the end user device first (or in near contemporaneity to the beginning of the directed stream of packets) and the last packet transmitted by the server device to the end user device needs to be received by the end user device last (or in near contemporaneity to the end of directed the stream of packets).

In order to facilitate the foregoing the subject disclosure discloses and describes a system, apparatus, or device comprising: a processor, and a memory that stores executable instructions that, when executed by the processor, facilitate performance of operations. The operations can comprise receiving network load data that indicates, as a first function of a wireless cellular device, a usage level, or output, of the wireless cellular network device over a defined duration of time; as a second function of the usage level, determining congestion data representing a congestion metric that indicates a level of congestion determined to be experienced by a first communication packet using the wireless cellular network device; and scheduling transmission of a second communication packet to an end user device via the wireless cellular network device, as a third function of the congestion data.

Additional operations that can be performed by the system, apparatus, or device can also include: determining, as a function of the congestion data, stability data representing a stability factor used for scheduling transmission of the second communication packet; and determining the stability data as a function of determining a clustering of the congestion data around an estimator, wherein the estimator is a mean level of congestion, a median level of congestion, or a modal level of congestion.

Further operations performed by the system, device, or apparatus can also include: determining the stability data as a function of determining a variance of the clustering of congestion data around the estimator; determining the stability data as a function of determining an average deviation of the clustering of congestion data from the estimator; determining the stability data as a function of determining a mean absolute deviation of the clustering of congestion data from the estimator; determining a skewness of a distribution of the congestion data from the estimator; and determining a kurtosis of a distribution of the congestion data in relation to the estimator.

Other additional operations that can be performed by the described system, device, or apparatus can comprise determining, as a function of the congestion data and the stability data, prediction data representing a prediction for a prospective defined period of time regarding the level of congestion that is to be experienced by the wireless cellular network device as a result of transmitting the second communication packet; and determining the level of congestion as a function of enumerating, from the network load data, a first number of congestion events that exceed a first threshold value, wherein the first threshold value is a defined utilization level.

Additional operations performed can include determining the level of congestion as a function of further enumerating, from the first number of congestion events that exceed the first threshold, a second number of congestion events that surpass a second threshold value, wherein the second threshold value is a defined time period over which a congestion event in the first number of congestion events exceeds the first threshold.

In accordance with a further embodiment, the subject disclosure describes a method, comprising a series of acts that can include receiving network load data that indicates, as a first function of a network device, a usage level of the network device over a defined duration of time, wherein the network load data represents cell utilization condition data received from one or more of an operation support system device, a mobile switching center device, a network probe device, a base station controller device, a base transceiver device, or a data storage device; as a second function of the usage level, determining congestion data representing a congestion metric that indicates a level of congestion determined to be experienced by a first communication packet using the network device, wherein the congestion metric is determined as a function of enumerating a number of congestion events that exceed a threshold value; and transmitting a second communication packet to an end user device via the network device, as a third function of the congestion data.

Additional acts can include using stability data representing a stability factor to transmit the second communication packet; using prediction data representing a prediction for a future defined period of time regarding the level of congestion that is to be experienced by the network device as a result of transmitting the second communication packet.

In accordance with a still further embodiment, the subject disclosure describes a computer readable storage device comprising instructions that, in response to execution, cause a computing system comprising a processor to perform operations. The operations can include receiving cell sector load data that indicates, as a function of a device, a usage level of the device over a defined duration of time; as a function of the cell sector load data, determining congestion data representing a congestion metric that indicates a level of congestion determined to have been experienced by a first communication packet using the device; and transmitting a second communication packet to an end user device via the device, as a function of the congestion data.

Now with reference to the Figures. FIG. 1 illustrates a system 100 for scheduling transmission of streams of transmission packets from a server device to an end user device or user equipment device. System 100 can include detection engine 102 that can be communicatively coupled to processor 104, memory 106, and storage 108. Detection engine 102 can be in communication with processor 104 for facilitating operation of computer or machine executable instructions and/or components by detection engine 102, memory 106 for storing data and/or the computer or machine executable instructions and/or components, and storage 108 for providing longer term storage of data and/or machine and/or computer executable instructions. Additionally, system 100 can also receive input 110 for use, manipulation, and/or transformation by detection engine 102 to produce one or more useful, concrete, and tangible result and/or transform one or more articles to different states or things. Further, system 100 can also generate and output the useful, concrete, and tangible result and/or the transformed one or more articles produced by detection engine 102 as output 112.

As will have been observed from the foregoing, system 100 can be any type of mechanism, machine, device, facility, and/or instrument that includes a processor and/or is capable of effective and/or operative communications with a network topology. Mechanisms, machines, devices, facilities, and/or instruments that can comprise system 100 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

Detection engine 102 in collaboration with processor 104, memory 106, and/or storage 108 can receive, as input 110, load data comprising cell/sector load/utilization conditions from, for example, mobile wireless cellular network devices that can comprise one or more of operations support system devices, mobile switching center devices, base station controller devices, base transceiver station devices, network probe devices, and/or one or more remote and/or local databases or data stores persisted to database server device(s). In response to receipt of load data, detection engine 102, as a function of, or based on, the load data can determine a level of congestion currently extant in the mobile wireless cellular network, thereby providing a congestion metric. The level of congestion can be measured, for instance, by observing that a quantum of congestion events exceed a first defined or predetermined threshold or first set point value, such as a mean utilization threshold value, and that the observed quantum of congestion events surpass a second defined or definable threshold value or second set point related, for example, to a period or duration of time, such as one millisecond, one second, one minute, etc. over which each of the observed quantum of congestion events extend. In this manner, long (and/or excessively long) duration congestion events that surpass, for example a mean, modal, and/or median utilization, can be noted, and such observations can thereafter be beneficially utilized by invoking or calling applications to schedule packet transmissions that can involve the transmission of continuous series or successive sequences of packets containing content that is required to be received by an end user device, for example, as an uninterrupted continuous sequence of consecutive communication packets. It should be noted in this regard that calling or invoking applications, such as video streaming applications, can have to transmit significant magnitudes of consecutive transmission packets over prolonged durations of time.

Thus, in response to, based on, or as a function of, the determined metric regarding the level of congestion, or more specifically, the quantum of long duration congestion events that have exceeded or surpassed a fixed or established utilization threshold value and/or that extend beyond a predetermined, identified, or distinct time period or time horizon assessed to have occurred in the mobile wireless cellular network, an application, such as a streaming application, utilizing the disclosed and described network load API can schedule transmission of packets in order to avoid or obviate long duration congestion events.

Detection engine 102, based on, as a function of, or in response to, determining the measured level of congestion metric associated with a mobile wireless cellular network (e.g., an observation regarding a number of network traffic occurrences that both transcend an established or defined threshold value pertaining to a mean, median, and/or modal mobile wireless cellular network utilization and/or that surpass a set point related to a defined duration of time over which each of the network traffic instances occurred) can determine a stability factor associated with the measured level of congestion metric. The stability factor can be determined by using one or more statistical methodologies to ascertain how stable the level of congestion within the mobile wireless cellular network has been in the immediate past. Such statistical methodologies can include, for example, determining whether or not there is a perceptible central clustering of the distribution of measured level of congestion around an estimator, such as a mean, median, or mode and thereafter determining the variability of the distribution of measured levels of congestion around the estimator. For instance, in order to determine the variability of the distribution around the estimator, variance and/or standard distribution analyses can be carried out.

Additional and/or alternative techniques that can be carried out by detection engine 102 to determine the centrality of the distribution of measured levels of congestion around the estimator can also include determining average deviations from the estimator, mean absolute deviations from the estimator, skewness of the distribution in relation to the center of the distribution, and/or the kurtosis of the distribution of measured levels of congestion (e.g., the relative peakedness or flatness of the distribution relative to the estimator).

Thereafter, as a function of, and/or based on, the stability factor determined by detection engine 102 and disseminated as output 112, an invoking or calling application utilizing the stability factor associated with the measured level of congestion metric (and/or in conjunction with the measured level of congestion metric) can transmit continuous uninterrupted steams of communication packets to end user devices and/or user equipment devices while avoiding any long duration congestion events that can be prevalent within the mobile wireless cellular network.

Additionally, detection engine 102, as a function of load data related to cell/sector load/utilization condition data received from mobile wireless cellular network devices that can include, operations support system devices, mobile switching center devices, network probe devices, base station controller devices, base transceiver devices, and/or databases stored in or on remote and/or local database devices or database storage devices, can determine a level of network congestion currently extant between the two or more endpoint network devices. The level of network congestion extant between the two or more endpoint network devices can be evaluated based on, or as a function of, an enumeration of congestion events that can have occurred during a defined or identifiable duration of time (e.g., nanosecond, millisecond, second, minute, quarter hour, half hour, one hour, between two defined and/or determinable points in time, etc.) that exceed a first threshold value or first set point that relates to a mean, median, and/or modal mobile wireless cellular network utilization and/or that surpasses a second threshold value or second set point that pertains to the duration or length of the each congestion event within the defined or identifiable duration of time. Based on, or as a function of, the level of network congestion, detection engine 102 can assess a stability factor associated with the level of network congestion. As noted earlier, the stability factor associated with the level of network congestion extant between the two or more endpoint network device can be obtained by using statistical methodologies, such as determining whether or not there is an observable clustering of the distribution of congestion events around an estimator, such as a mean, median, or modal congestion event, and/or thereafter determining a variance in relation to the distribution of congestion events from the mean, median, or modal congestion event. Additional and/or alternative non-limiting statistical techniques that can also be beneficially utilized in this regard can include: obtaining an average deviation from the estimator, identifying a mean absolute deviation from the estimator, evaluating skewness of the distribution in relation to the estimator, and/or assessing a kurtosis associated with the distribution of congestion events relative to the estimator.

Detection engine 102 can also supply a prediction related to the stability factor, wherein the prediction regarding the stability factor can be associated with the stability factor. In this regard, the prediction supplied by detection engine 102 provides an indication as to whether or not the congestion or the non-congestion and/or the level of congestion or level of non-congestion is expected to last into a prospective defined or determinable near future time period. One technique that can be used by detection engine 102 for assigning or associating a prediction regarding the stability factor associated with the level of congestion can include employing a probabilistic based or statistical based approach, for example, in connection with making an inference related to the stability factor associated with the level of congestion. In this instance, inferences can be based in part upon explicit training of classifiers or implicit training based upon system feedback, previously persisted metrics associated with congestion levels (e.g., supplied or obtained from operation support system devices, mobile switching center devices, network probe devices, base station controller devices, base transceiver station devices, one or more databases and/or data stores persisted to remote and/or local data storage devices, and the like). Any suitable scheme (e.g., neural networks, expert systems, Bayesian belief networks, support vector machines (SVMs), Hidden Markov Models (HMMs), fuzzy logic, data fusion, etc.) can be used by detection engine 102 to provide an appropriate prediction to associate with the stability factor. Historical data and/or extrinsic data, for example, can beneficially be used by detection engine 102 to compute a cost of making an incorrect determination or inference versus a benefit of making a correct determination or inference. Accordingly, a utility-based analysis can be employed to provide a prediction in relation to the stability factor. Ranking and confidence measures can also be determined and employed in connection with such a predictive analysis.

It should be noted in connection with the foregoing, that while the relationship between detection engine 102 and invoking applications has been described in context of a "pull" mechanism (e.g., applications request detection engine 102 to supply metrics, individually and/or in combination, related to levels of extant congestion, stability factors associated with levels of congestion, and/or predictions related to congestion and/or stability or instability assessments into the prospective future), the subject disclosure is not so limited, as "push" mechanisms for disseminating observed congestion levels, stability factors associated with the congestion levels, and/or predictions related to the congestion levels and/or determined stability factors can be facilitated and/or effectuated by detection engine 102.

In accordance with a "push" mechanism, the mechanism can be initiated, for example, by an application requesting detection engine 102 to supply metrics related to extant network congestion, stability factors related to the network congestion, and/or predications related to predicted future congestion levels and/or stability factors associated with predicted future congestion levels. Additionally and/or alternatively, the "push" mechanism can be initiated when an application requests detection engine 102 to supply one of the extant network congestion, the stability factors related to the network congestion, or predictions related to predicted future congestion levels and/or stability factors associated with the predicted future congestion levels. Once the supply of congestion metrics has been initiated, detection engine 102 can deliver (e.g., push) congestion metrics on a periodic and/or on a random basis for as long as is required.

Typically, requests for congestion metrics under the 'pull' mechanism to initiate dissemination of congestion metrics are independent from communication requests initiating service of content (e.g., video or audio files). Thus, a request for congestion metrics (e.g., levels of network congestion, stability factors associated with the levels of network congestion, and/or predictions related to prospective levels of network congestion and/or predictions in connection with determined stabilities/instabilities related to impending levels of network congestion) are generally not received or solicited in response to, based on, or as a function of, requests from an end user device or user equipment device for the supply of a service, such as streaming video, for instance. For example, a request, to a content streaming server device from a content streaming client device, for service of streaming content (e.g., a content file) signifies that a streaming content file will be transferred from the content streaming server device to a requesting content streaming client device in a communication transaction (e.g., the request for content service from the client device to the server device and the fulfillment of the request by the streaming of requested content by the server device to the requesting client device), wherein congestion metrics that can have been contemporaneously obtained, from and/or determined by detection engine 102, by the content streaming server device (or in instances, the content streaming client device) independently from the request received from the content streaming client device can be used to facilitate or effectuate communications between the content streaming server device and/or the content streaming client device.

As will be appreciated by those of ordinary skill, where the stream of content sent from the server device to the client device is of short duration (e.g., less than or equal to five minutes), a single suite of congestion metric data (e.g., determined levels a network congestion, stability factors, and/or predictions into the future related to network congestion and/or stability/instability of network congestion) may be sufficient. However, there can be instances where streaming content can take significantly greater durations of time to successfully complete. For example, should streaming of content take sixty minutes, multiple suites of congestion metric data can be required and can be received and/or solicited from detection engine 102. Thus, detection engine 102 can disseminate, as output 112, congestion metric data at periodic and/or randomly dispersed time intervals. For instance and in accordance with an embodiment, during the streaming of a sixty minute video, detection engine 102 can dispatch, as output 112, a successive suite of congestion metrics (or the respective individual components that comprise the suite) at periodic five minute intervals. Further, in accordance with a further additional and/or alternative embodiment for the streaming of the aforementioned sixty minute video, detection engine 102 can disseminate the group of congestion metrics (or the individual components of the group of congestion metrics) at randomly identified/determined time intervals.

In accordance with the foregoing, it should be observed that the various devices (e.g., end-user client device, streaming server device, and system 100—the device on which detection engine 102 is operational) can reside on disparate segments of the Internet and/or the wireless cellular network. For instance, the end-user device can be connected to a first segment of a wireless cellular network, the device on which detection engine 102 is operational can also be communicatively coupled to a second segment of the wireless cellular network, and/or the streaming server device can also be communicatively coupled, via the Internet, to the wireless cellular network. In this instance, the streaming server device, in collaboration with facilities provided by detection engine 102 on the second segment of the wireless cellular network, can assess the network congestion being experienced by the end-user client device on the first segment of the wireless cellular network and can't adjust the streaming of content to the client device accordingly.

As will also be appreciated by those of ordinary skill in the art, there are additional/alternative techniques that can be used to facilitate content streaming/transmission. One illustrative technique of content streaming/transmission is adaptive bit rate. In such situations, it is not the streaming service device that controls the bit rates of content transmission/streaming in response to network congestion, but rather the streaming content is created in multiple bit rate formats; there are multiple files for the same content, but disparate/different video qualities.

In accordance with content transmission/streaming using adaptive bit rates, a content client operational on an end user device can be informed about the multiple bit rate formatted versions of the content e.g., using a manifest file. The various versions of the content (in various disparate bit rate formats) can have been cut into small broadcast chunks/ segments, for example chunks/segments of about 2 seconds to about 10 seconds duration. The content client, operating on the end-user device, can use output from detection engine 102 to gather information regarding network congestion (e.g. levels of extant network congestion, the stability associated with the identified levels of network congestion, and/or predictions regarding the duration over which the network congestion is expected to last, as well as predictions as to how stable or unstable the network congestion is expected to be into an imminent and/or defined duration of time). It should be noted in regard to the dissemination of metrics supplied and/or obtained from detection engine 102, that such information can be dispatched individually and as a group, suite, or set of metrics. Detection engine 102 can thus disseminate, or on request supply, the metrics on an individual basis and/or detection engine 102 can dispatch, or on request deliver, a grouping of the metrics at defined instances/intervals of time.

A client operational on an end-user device, in response to, based on, or as a function of, congestion metrics received, as output 112, from detection engine 102, can determine which of the various and disparate multi-bit rate formatted content to request from the content streaming server to satisfy a request for content. For example, if it is determined, by the end-user device, as a function of congestion metrics received from and output by detection engine 102, that network congestion is low, the content client executing on the end-user device can cause content segments formatted for the highest bit rate with the highest video quality to be transmitted from the content server. Further, if the end-user device determines, based on the congestion metrics or a subset, or an individual congestion metric, that a prospective duration of time is expected to be a period of high network congestion, the content client operational on the end-user device can cause content segments formatted for a lower bit rate and/or a commensurately lower video quality to be dispatched from the content service operational on a content server device.

Figure 2:
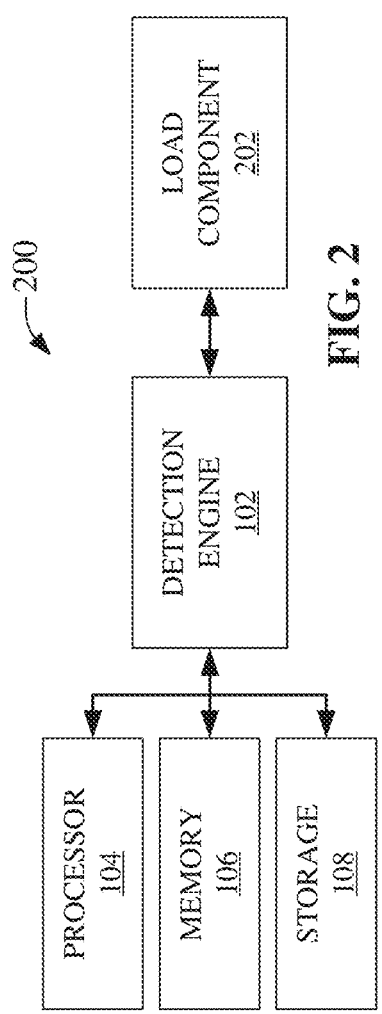
FIG. 2 is a further depiction of a system for transmitting consecutive, continuous, and/or uninterrupted streams of network communication packets between network endpoint devices, in accordance with aspects of the subject disclosure.

FIG. 2 provides further illustration of a system 200 for transmitting consecutive, continuous, and/or uninterrupted streams of network communication packets between network endpoint devices, such as server class computing devices, laptop computer devices, tablet computer devices, cellular telephony devices, Smartphone devices, personal digital assistant devices, industrial and/or consumer electronic devices, terrestrial and/or orbital communication devices, and the like. As depicted, system 200 can include load component 202 that can utilize facilities provided by detection engine 102, processor 104, memory 106, and storage 108 to supply a congestion level metric associated with a mobile wireless cellular network. In accordance with an embodiment and/or aspect, load component 202 can determine a metric (e.g., a congestion metric) associated with the level of congestion currently prevalent within the mobile wireless cellular network (or a sub-portion thereof comprising a first mobile wireless cellular device and a second mobile wireless cellular device) by employing load data comprising cell/sector load/utilization conditions received as input 110 from, for example, operation support system devices, network probe devices, mobile switching center devices, base station controller devices, base transceiver devices, databases stored and/or associated with local and/or remote computing devices and/or local and/or remote data storage devices. Load component 202 can determine the level of congestion currently prevalent within the mobile wireless cellular network by noting the number of congestion events that exceed a first defined or pre-established threshold or set point and/or that surpass a second defined or pre-established threshold or set point, wherein first defined or pre-established threshold or set point can, for example, be related to a mean, median, or modal utilization mobile wireless cellular network utilization, and the second defined or pre-established threshold or set point related to the duration of each of the congestion events that exceed the first defined or pre-established threshold or set point. The determined metric can thereafter be output as output 112 and thereafter can beneficially utilized by calling or invoking applications to schedule and/or transmit continuous streams of network communication packets to receiving mobile wireless cellular network end point and/or end user devices.

Figure 3:
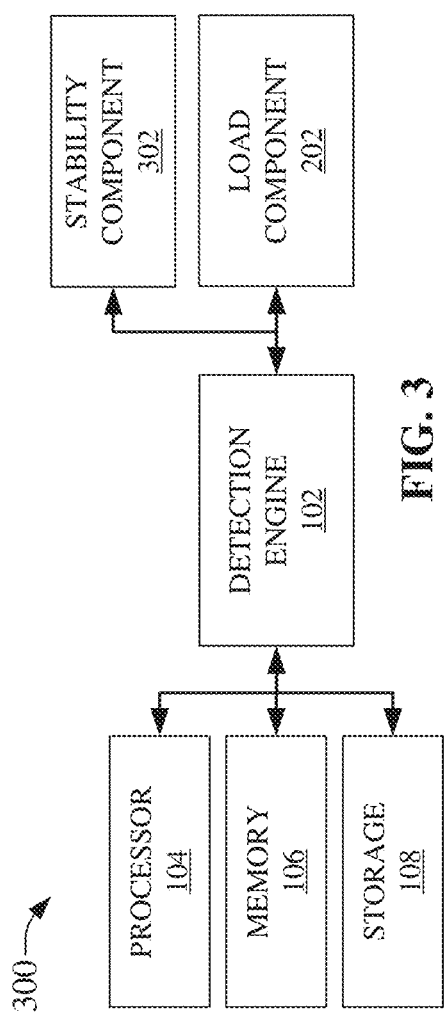
FIG. 3 illustrates a further system for transmitting or scheduling transmissions of consecutive network communication packets in a continuous uninterrupted stream from a server end point device to a plurality of client end point devices in accordance with aspects of the subject disclosure.

FIG. 3 provides illustration of system 300 for transmitting or scheduling transmissions of consecutive network communication packets in a continuous uninterrupted stream from a server end point device to a plurality of client end point devices. In accordance with an embodiment the server end point device can be a smart phone device, tablet computer device, laptop computer device, notebook computer device, desktop computer device, server class computing device(s), electronic devices inclusive of processor(s) and memories, wired and/or wireless consumer and/or commercial electronic devices, etc. Similarly, the plurality of client end point devices can include consumer equipment devices, such as televisions, digital video recorders, terrestrial and/or satellite industrial and/or consumer store and/or forward devices used for contemporaneous and/or delayed broadcast or rebroadcast of content, and the like.

As illustrated, system 300 can include stability component 302 that can operate in collaboration with load component 202 and can be communicatively coupled to detection engine 102, processor 104, memory 106, and/or storage 108. In accordance with an embodiment, stability component 302 can utilize the congestion metric generated or supplied by load component 202 to determine a stability factor to associate with the congestion metric. The stability factor can be determined by stability component 302 by using one or more statistical techniques to ascertain how stable the level of congestion within the mobile wireless cellular network has been in the immediate past. Illustrative statistical techniques that can be employed by stability component 302 to determine the constancy of the level of congestion within the mobile wireless cellular network (or portions thereof) can include determining whether or not there is a centrality of the clustering of the distribution of observed congestion events (e.g., congestion events that exceed the above noted first defined threshold or set point and/or go beyond the second defined threshold or set point) around an estimator, such as a mean, median, or mode.

Additional and/or alternative techniques that can employed by stability component 302 can include determining the variability of the distribution of observed congestion events around the estimator by determining a variance and/or standard deviation, determining average deviations from the estimator, mean absolute deviations from the estimator, skewness of the distribution in relation to the center of the distribution, and/or kurtosis of the distribution of the observed congestion events.

The stability factor determined by stability component 302 can then be output, as output 112, and used by an invoking or calling application to facilitate scheduling and/or transmission of continuous uninterrupted streams of network communication packets directed toward end user devices and/or user equipment devices. In using the stability factor determined by stability component 302 invoking or calling applications can avoid long duration congestion events that can, at certain instances of time, be prevalent within a mobile wireless cellular network and/or between one or more transmitting end point devices and one or more receiving end point devices that can comprise the mobile wireless cellular network.

Figure 4:
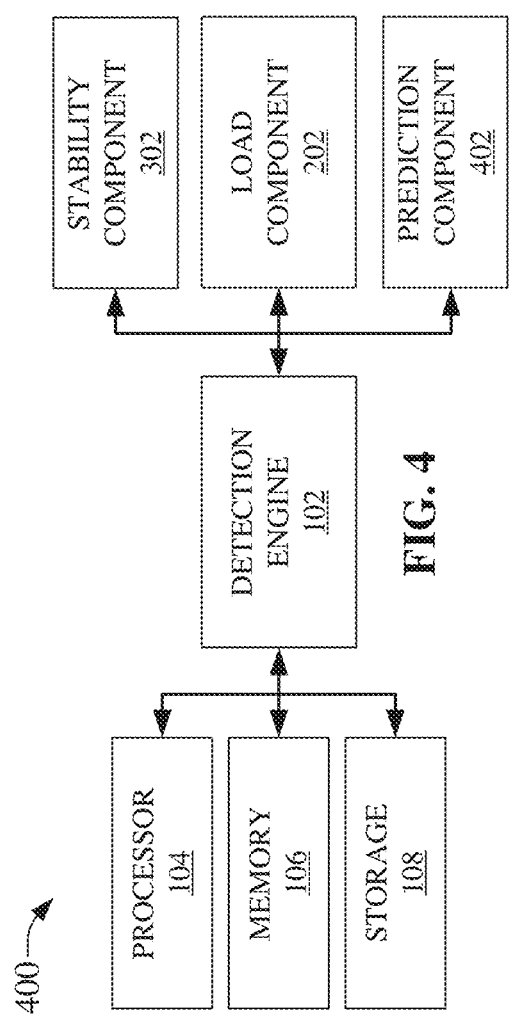
FIG. 4 is still yet an additional illustration of system for transmitting and/or scheduling transmission of network communication packets in a continuous, uninterrupted, and/or consecutive series between mobile wireless cellular endpoint network devices in accordance with aspects of the subject disclosure.

FIG. 4 provides additional illustration of system 400 for transmitting and/or scheduling transmission of network communication packets in a continuous, uninterrupted, and/or consecutive series between mobile wireless cellular endpoint network devices. Illustrative mobile wireless cellular endpoint network devices can include first devices tasked with scheduling and/or transmitting a continuous, uninterrupted, and/or consecutive series of mobile wireless cellular network communication packets and second devices tasked with receiving the continuous, uninterrupted, and/or consecutive series of mobile wireless cellular network communication packets.

As depicted system 400 can include detection engine 102, processor 104, memory 106, storage 108, load component 202, and stability component 302. Additionally, system 400 can also comprise predication component 402 that can utilize communicatively coupled detection engine 102, processor 104, memory 106, storage 108, load component 202, and/or stability component 302 to generate and associate a prediction related to the stability factor that can have been generated by stability component 302. The prediction generated and assigned by prediction component 402 to a previously generated stability factor can provide prospective indication as to whether or not the congestion (or as the case may be, non-congestion) and/or the level of congestion or non-congestion is expected to last into an immediate and/or proximate defined and definable time period. A technique that can be employed by prediction component 402 for the purposes of assigning or associating a prediction regarding the stability factor associated with the level of congestion can include using a probabilistic based or statistical based approach, for example, in connection with making an inference related to the stability factor associated with the level of congestion. In this instance, prediction component 402 can make inferences that can be based upon explicit training of classifiers or implicit training based on system feedback, previously persisted metrics associated with past congestion levels (e.g., supplied or obtained from operation support system devices, mobile switching center devices, base station controller devices, base transceiver station devices, one or more databases and/or data stores persisted to remote and/or local data storage devices, network probe devices, and the like). Any suitable scheme (e.g., neural networks, expert systems, Bayesian belief networks, support vector machines (SVMs), Hidden Markov Models (HMMs), fuzzy logic, data fusion, etc.) can be used by predication component 402 to provide an appropriate prediction to associate with the stability factor. Historical data and/or extrinsic data, for example, can beneficially be used by prediction component 402 to compute a cost of making an incorrect determination or inference versus a benefit of making a correct determination or inference. Accordingly, a utility-based analysis can be employed by prediction component 402 to provide a prediction in relation to the stability factor. Ranking and confidence measures can also be determined and employed by predication component 402 in connection with such a predictive analysis.

FIGS. 5A and 5B provide representation of a mean network utilization that can be encountered or experienced in a typical mobile wireless cellular network. FIG. 5A illustrates network congestion that can occur many times over a defined or established period of time. As will be noted on examination of FIG. 5A there are multiple instances where network utilization surpasses or exceeds a defined mean utilization threshold or set point (that in this illustration has been defined as 50%), and there are multiple instances where network utilization peaks at 100%. Such a bursty utilization profile, as represented in FIG. 5A, can be typical in a mobile wireless cellular network and for the most part streaming applications (such as multimedia stream applications), for instance, are sufficiently equipped with ameliorative techniques to handle these short duration congestion events.

FIG. 5B in contrast represents a mean network utilization that streaming applications are not generally able to ameliorate. As will be observed upon scrutiny of FIG. 5B the level of network congestion both exceeds the defined mean utilization threshold or set point and further peaks at a maximum utilization level of 100% for a significant duration of time. It is these long duration congestion events that most streaming applications, for example, are not configured or adapted to handle. From the perspective of such a streaming application, the ability to know in advance of the possibility and/or the extent (predicted duration and/or stability) of such an extended all consuming congestion event can aid these applications to better schedule and/or transmit to one or more receiving end user devices continuous uninterrupted streams of content encapsulated in consecutive network communication packets.

Figure 6:
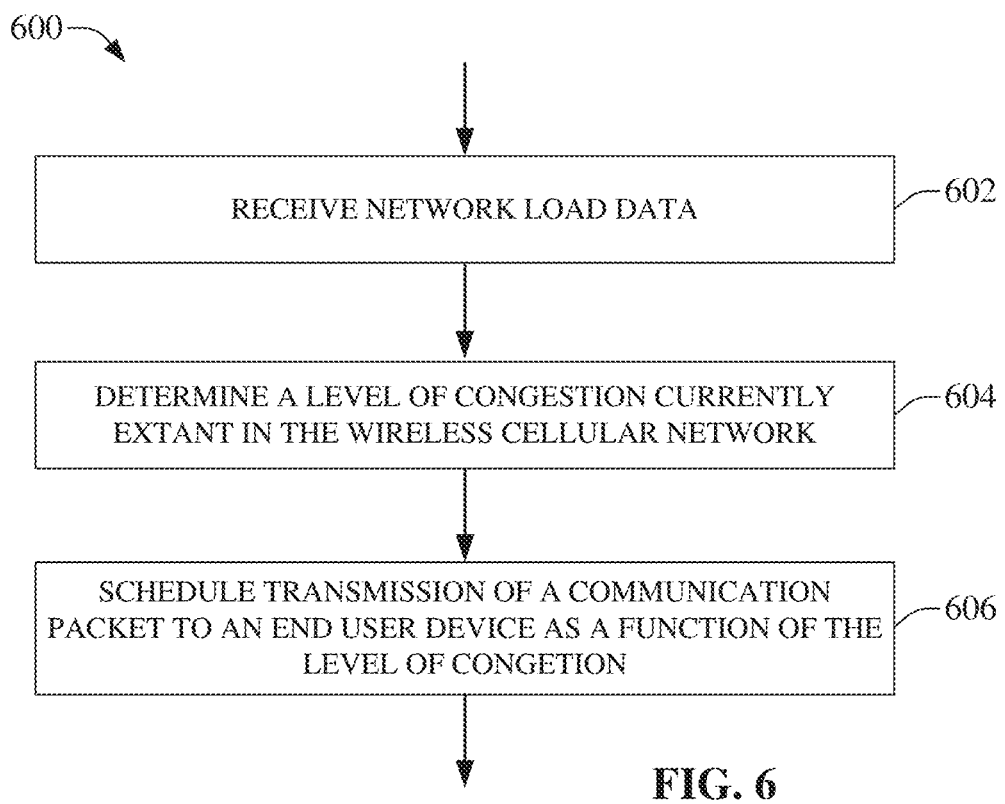
FIG. 6 provides illustration of a flow chart or method for scheduling transmission of streams of transmission packets from a server device to an end user device or user equipment device in accordance with aspects of the subject disclosure.
Figure 7:
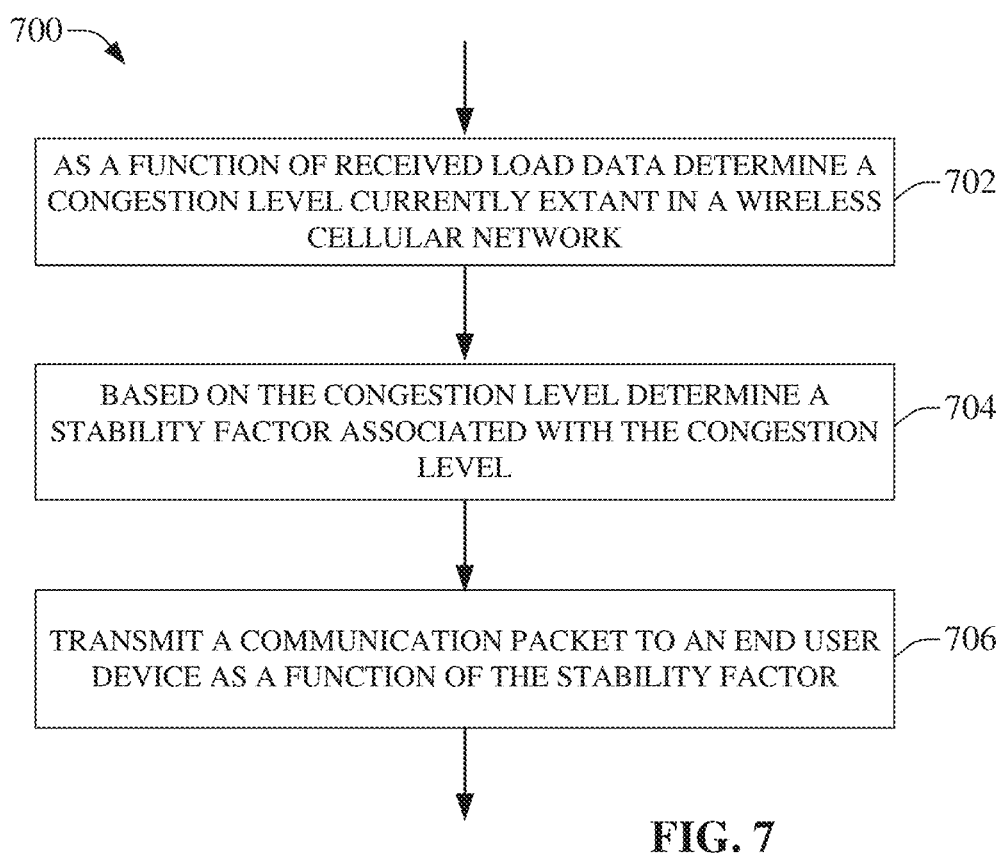
FIG. 7 provides another illustration of a flow chart or method for scheduling transmissions of consecutive transmission packets in a continuous uninterrupted stream from a server device to an end user device or user equipment device in accordance with aspects of the subject disclosure.
Figure 8:
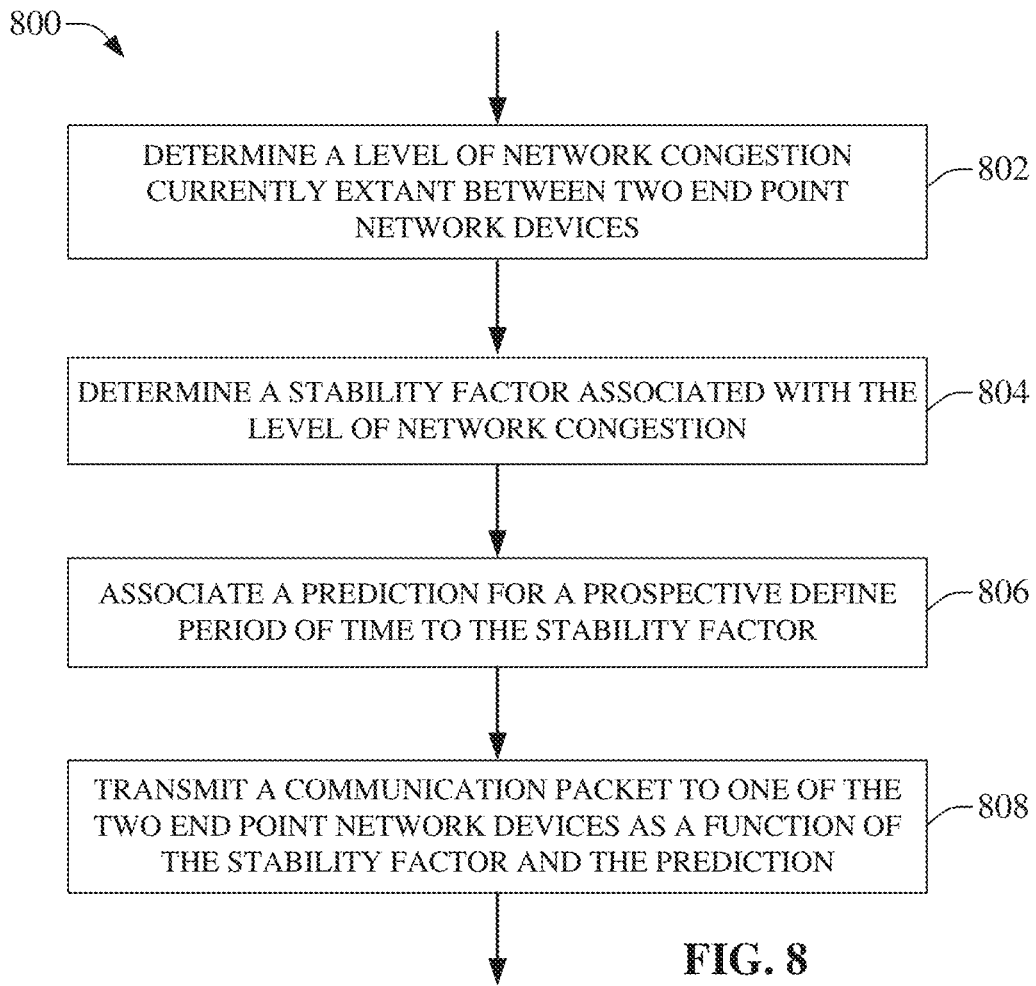
FIG. 8 illustrates another flow chart or method for scheduling transmission of communication packets in an uninterrupted, continuous, and/or consecutive stream between two or more endpoint network devices in accordance with aspects of the subject disclosure.

In view of the example system(s) described above, example method(s) that can be implemented in accordance with the disclosed subject matter can be better appreciated with reference to flowcharts in FIGS. 6-8. For purposes of simplicity of explanation, example methods disclosed herein are presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
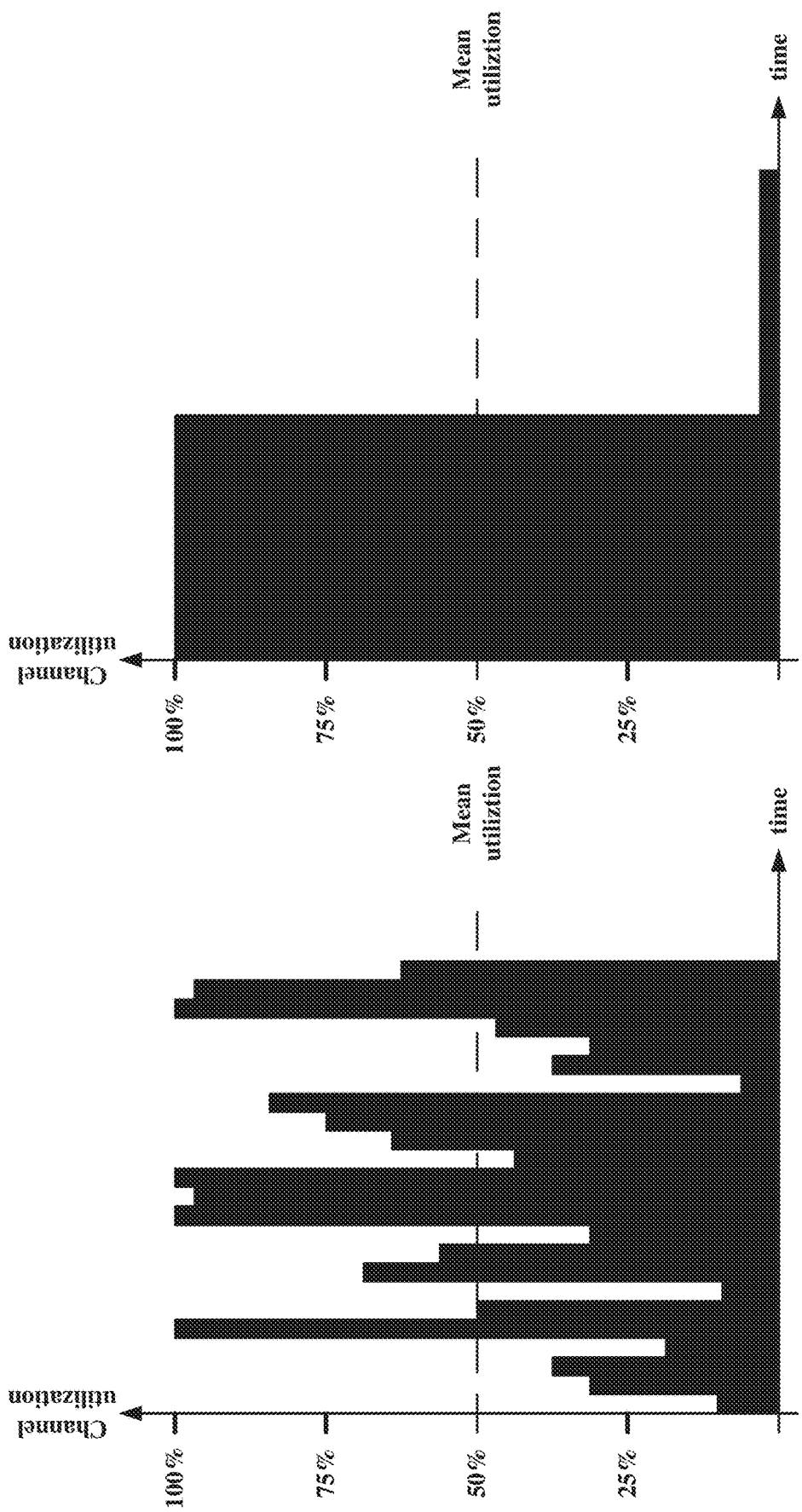
FIGS. 5A and 5B provide representation of a mean network utilization that can be encountered or experienced in a typical mobile wireless cellular network in accordance with aspects of the subject disclosure.

FIG. 6 illustrates a method 600 for scheduling transmission of streams of transmission packets from a server device (e.g., a streaming server device, such as, a smart phone, tablet computer, laptop computer, notebook computer, desktop computer, server class computing devices with or without wired and/or wireless capabilities, electronic devices inclusive of processors and/or memories, consumer and/or commercial wired/wireless devices, industrial wired and/or wireless equipment, avionics/aviation components) to an end user device or user equipment device, such as a tablet computer and/or a smart phone. Method 600 can commence at 602 where load data comprising cell/sector load/utilization conditions can be received from, for example, mobile wireless cellular network devices that can comprise one or more of an operations support system device, network probe device, mobile switching center device, base station controller device, base transceiver station device, and/or one or more relevant remote and/or local databases or data stores persisted to database server device(s). At 604, a level of congestion extant in the mobile wireless cellular network can be determined. The level of congestion can be measured, for instance, by observing a quantum of congestion events that exceed a first defined or predetermined threshold or first set point (e.g., a mean utilization threshold as illustrated in FIG. 5) and that surpass a second defined or definable threshold or second set point related, for example, to a period or duration of time, such as one millisecond, one second, one minute, etc. In this manner, long (and/or excessively long) duration congestion events that surpass, for example a mean, modal, and/or median utilization, can be noted, and thereafter can be beneficially utilized by invoking or calling applications to schedule packet transmissions that can involve the transmission of continuous series or successive sequences of packets containing content that is required to be received by an end user device as an uninterrupted continuous sequence of consecutive communication packets. At 606, in response to, based on, or as a function of, the determined metric regarding the level of congestion, or more specifically, the quantum of long duration congestion events that have exceeded or surpassed a fixed or established utilization threshold and/or that extend beyond a predetermined, identified, or distinct time period or time horizon assessed to have occurred in the mobile wireless cellular network, an application utilizing the disclosed and described network load API can schedule transmission of packets in order to avoid or obviate these long duration congestion events.

FIG. 7 illustrates a further method 700 for scheduling transmissions of consecutive transmission packets in a continuous uninterrupted stream from a server device, such as a smart phone, tablet computer, laptop computer, notebook computer, desktop computer, server class computing devices, electronic devices that include processors and/or memories, wired and/or wireless consumer and/or commercial devices, industrial equipment, avionics/aviation components, and the like, to an end user device or user equipment device, such as a small form factor device such as a tablet computer and/or a smart phone.

Method 700 can commence at 702 where a measured level of congestion can be determined or ascertained as a function of received load data related to cell/sector load/utilization conditions prevalent in a mobile wireless cellular network can be gleaned or obtained from one or more mobile wireless cellular network devices, such as operation support system devices, mobile switching center devices, base station controller devices, base transceiver devices, network probe devices, and/or databases persisted to, or stored in, remote and/or local database devices or database storage devices. At 704 based on, as a function of, or in response to, determining the measured level of congestion metric associated with a mobile wireless cellular network (e.g., an observation regarding a number of network traffic occurrences that both transcend an established or defined threshold pertaining to a mean, median, and/or modal mobile wireless cellular network utilization and that surpass a set point related to a defined duration of time) a stability factor associated with the measured level of congestion metric can be determined. The stability factor can be determined by using one or more statistical methodologies to ascertain how stable the level of congestion within the mobile wireless cellular network has been in the past. Such statistical methodologies can include, for example, determining whether or not there is a perceptible central clustering of the distribution of measured level of congestion around an estimator, such as a mean, median, or mode and thereafter determining the variability of the distribution of measured levels of congestion around the estimator. For instance, in order to determine the variability of the distribution around the estimator, variance and/or standard distribution analyses can be carried out.

Additional and/or alternative techniques to determine the centrality of the distribution of measured levels of congestion around the estimator can also include determining average deviations from the estimator, mean absolute deviations from the estimator, skewness of the distribution in relation to the center of the distribution, and/or the kurtosis of the distribution of measured levels of congestion (e.g., the relative peakedness or flatness of the distribution relative to the estimator).

Thereafter, at 706, as a function of, and/or based on, the stability factor determined at 704, an invoking or calling application utilizing the stability factor associated with the measured level of congestion metric (and/or in conjunction with the measured level of congestion metric) and generated by the disclosed and described network load API can transmit continuous uninterrupted steams of communication packets to end user devices and/or user equipment devices while avoiding any long duration congestion events that can be prevalent within the mobile wireless cellular network.

FIG. 8 illustrates another method 800 for scheduling transmission of communication packets in an uninterrupted, continuous, and/or consecutive stream between two or more endpoint network devices, such as server devices (e.g., enterprise or industrial class computing devices, and the like) and/or user equipment devices (e.g., consumer equipment devices such as televisions, digital video recorders, terrestrial and satellite industrial store and/or forward devices used for contemporaneous broadcast of content, delayed broadcast of content, and/or for subsequent and/or delayed rebroadcast of content, etc.). Method 800 can commence at 802 where, as a function of load data related to cell/sector load/utilization condition data received from mobile wireless cellular network devices that can include, network probe devices, operations support system devices, mobile switching center devices, base station controller devices, base transceiver devices, and/or databases stored in or on remote and/or local database devices or database storage devices, a level of network congestion currently extant between the two or more endpoint network devices can be determined. The level of network congestion extant between the two or more endpoint network devices can be evaluated based on, or as a function of, an enumeration of congestion events that can have occurred during a defined or identifiable duration of time (e.g., nanosecond, millisecond, second, minute, quarter hour, half hour, one hour, between two defined and/or determinable points in time, etc.) that exceed a first threshold or first set point that relates to a mean, median, and/or modal mobile wireless cellular network (or sub-portions thereof—cells or cell sectors controlled by one or more base stations) utilization and/or that surpasses a second threshold or second set point that pertains to the duration or length of the congestion event within the defined or identifiable duration of time. Based on, or as a function of, the foregoing level of network congestion a stability factor associated with the level of network congestion can be assessed at 804. As noted earlier, the stability factor associated with the level of network congestion extant between the two or more endpoint network device can be obtained by using statistical methodologies, such as determining whether or not there is an observable clustering of the distribution of congestion events around an estimator, such as a mean, median, or modal congestion event, and/or thereafter determining a variance in relation to the distribution of congestion events from the mean, median, or modal congestion event. Additional and/or alternative non-limiting statistical techniques that can also be beneficially utilized in this regard can include: obtaining an average deviation from the estimator, identifying a mean absolute deviation from the estimator, evaluating skewness of the distribution in relation to the estimator, and/or assessing a kurtosis associated with the distribution of congestion events relative to the estimator.

At 806, a prediction related to the stability factor can be carried out wherein the prediction regarding the stability factor can be associated with the stability factor. In this regard, the prediction provides an indication as to whether or not the congestion or the non-congestion and/or the level of congestion or level of non-congestion is expected to last into a prospective defined or determinable near future time period. One technique for assigning or associating a prediction regarding the stability factor associated with the level of congestion can include employing a probabilistic based or statistical based approach, for example, in connection with making an inference related to the stability factor associated with the level of congestion. In this instance, inferences can be based in part upon explicit training of classifiers or implicit training based at least in part upon system feedback, previously persisted metrics associated with congestion levels (e.g., supplied or obtained from operation support system devices, mobile switching center devices, network probe devices, base station controller devices, base transceiver station devices, one or more databases and/or data stores persisted to remote and/or local data storage devices, and the like). Any suitable scheme (e.g., neural networks, expert systems, Bayesian belief networks, support vector machines (SVMs), Hidden Markov Models (HMMs), fuzzy logic, data fusion, etc.) can be used to provide an appropriate prediction to associate with the stability factor. Historical data and/or extrinsic data, for example, can beneficially be used to compute a cost of making an incorrect determination or inference versus a benefit of making a correct determination or inference. Accordingly, a utility-based analysis can be employed to provide a prediction in relation to the stability factor. Ranking and confidence measures can also be calculated and employed in connection with such a predictive analysis.

Figure 9:
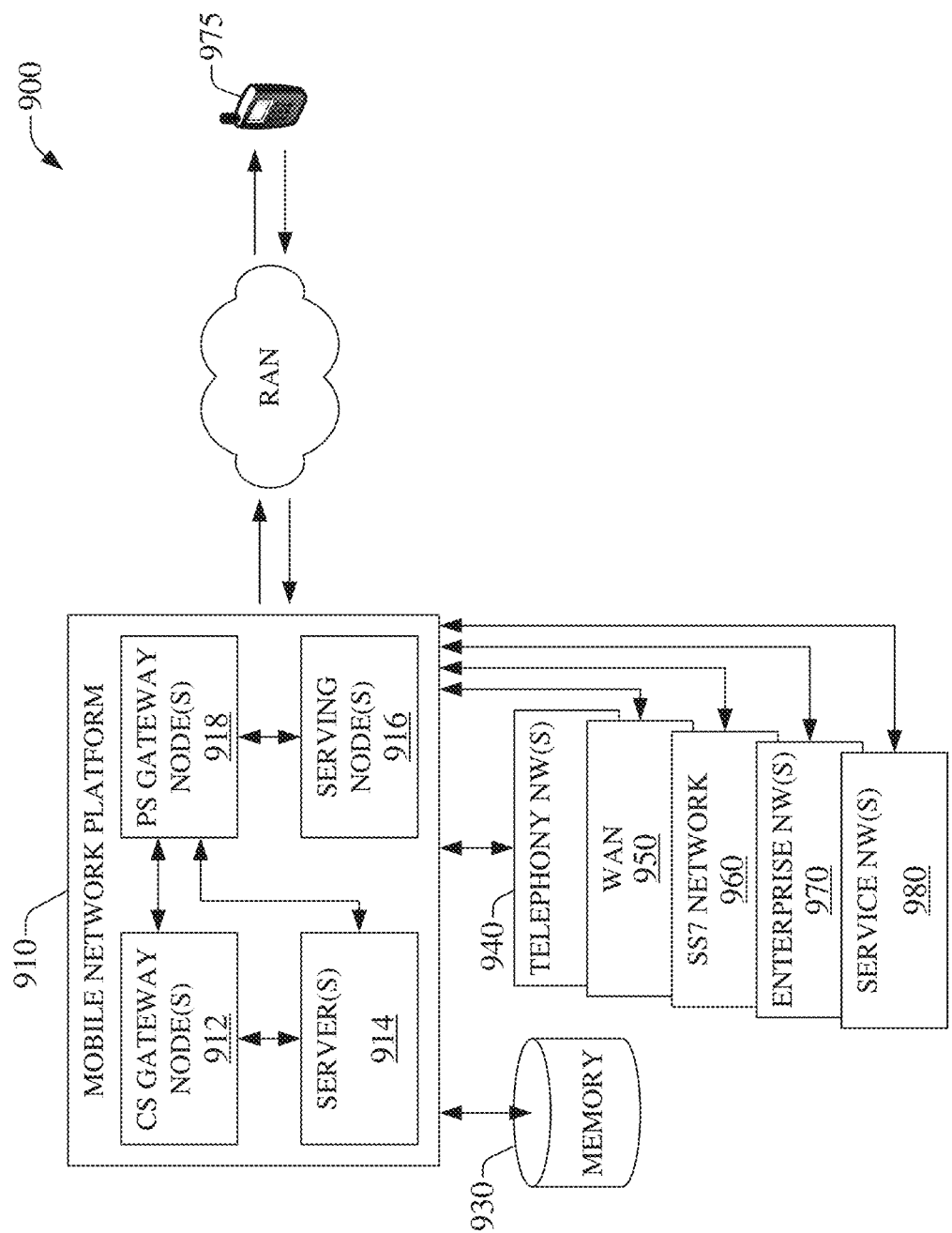
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
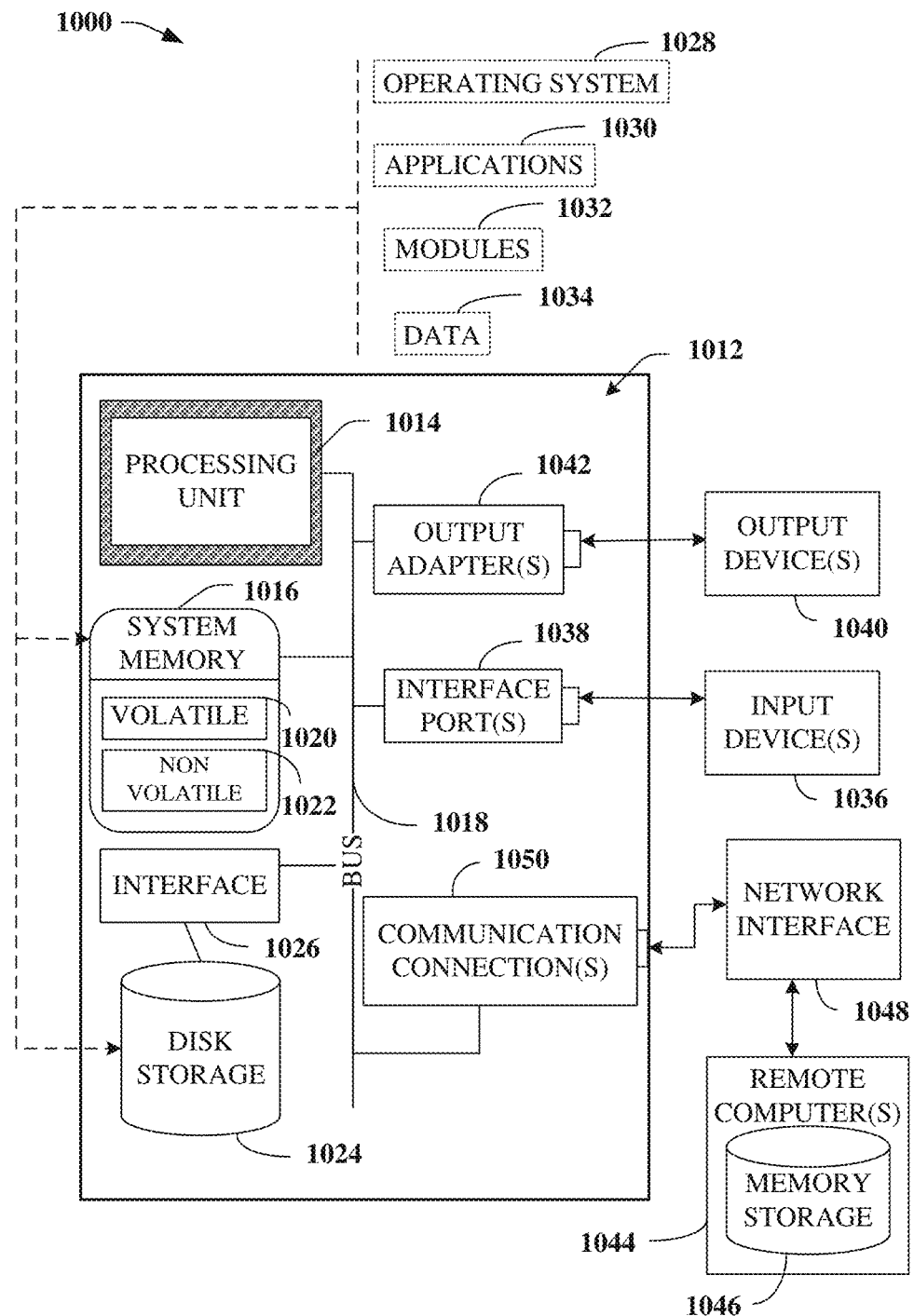
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 100, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile device 102 and/or portable device 104 can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   based on a first delay experienced by a first communication packet sent by network equipment comprising a processor, determining, by the network equipment, a predictive indicator of a second delay that is expected to be experienced by a second communication packet sent by the network equipment, wherein the determining comprises determining the predictive indicator based on a statistical function related to a distribution of a cluster of the first delay and the second delay around an estimator, wherein the estimator is associated with a determined level of congestion; and
   facilitating, by the network equipment, a transmission of streaming content to a user equipment based on the predictive indicator, wherein the facilitating comprises scheduling the transmission of the streaming content based on avoidance of the second delay.

2. The method of claim 1, further comprising:
   prior to the determining of the predictive indicator, determining, by the network equipment, a congestion metric that represents the first delay experienced by the first communication packet sent by the network equipment.

3. The method of claim 1, wherein the determining of the predictive indicator further comprises determining a variance of the cluster of the first delay and the second delay around the estimator.

4. The method of claim 3, wherein the estimator is based on a level selected from a group of levels comprising a mean level of congestion, a median level of congestion, and a modal level of congestion.

5. The method of claim 3, wherein the network equipment is first network equipment, and wherein the method further comprises:
   determining, by the first network equipment, the estimator based on a first mean level of delay expected to be experienced by the second communication packet being sent by the first network equipment to second network equipment, and a second mean level of delay expected to be experienced by the second communication packet being sent, by the first network equipment via the second network equipment, to third network equipment.

6. The method of claim 3, wherein the network equipment is first network equipment, and wherein the method further comprises:
   determining, by the first network equipment, the estimator based on a first median level of delay expected to be experienced by the second communication packet being sent to second network equipment, and a second median level of delay expected to be experienced by the second communication packet being sent, by the first network equipment via the second network equipment, to third network equipment.

7. The method of claim 3, wherein the network equipment is first network equipment, and wherein the method further comprises:
   determining, by the first network equipment, the estimator based on a first modal level of delay expected to be experienced by the second communication packet being sent to second network equipment and a second modal level of delay expected to be experienced by the second communication packet being sent, by the first network equipment via the second network equipment, to third network equipment.

8. The method of claim 1, wherein the determining of the predictive indicator further comprises determining the predictive indicator based on an enumeration of congestion events included in load data received from the network equipment.

9. The method of claim 8, wherein the enumeration of the congestion events comprises events that occurred during a defined time interval that exceed a defined value related to a duration of a congestion event during the defined time interval.

10. The method of claim 8, wherein the enumeration of the congestion events comprises events that occurred during a defined time interval that exceed a defined value related to a network utilization value.

11. The method of claim 1, wherein the scheduling comprises modifying a size of content included in the second communication packet.

12. A system, comprising:
a processor; and
a memory that stores executable instructions that, when executed by the processor, facilitate performance of operations, comprising:
determining a throughput indicator based on a statistical function of a cluster of a first delay and a second delay around an estimator; and
transmitting streaming content to a user equipment based on the throughput indicator, wherein the transmitting comprises scheduling the streaming content based on mitigation of the second delay on the streaming content, wherein the first delay and the second delay are respective delays experienced by a communication packet sent to network equipment.

13. The system of claim 12, wherein the operations further comprise:
prior to the determining of the throughput indicator, determining a congestion metric as a function of load data received from the network equipment, wherein the congestion metric is representative of the first delay experienced by the communication packet being sent to the network equipment.

14. The system of claim 13, wherein the network equipment is a first network equipment, and wherein the determining the throughput indicator comprises:
determining the second delay experienced by the communication packet being sent to second network equipment via the first network equipment.

15. The system of claim 13, wherein the determining of the throughput indicator comprises:
determining a statistical function associated with a distribution of the cluster of the first delay and the second delay around the estimator.

16. The system of claim 12, wherein the determining of the throughput indicator comprises:
determining a stability factor associated with the first delay.

17. The system of claim 12, wherein the determining of the throughput indicator comprises:
determining a statistical function associated with a distribution of the cluster of the first delay and the second delay around the estimator.

18. The system of claim 12, wherein the determining of the throughput indicator comprises:
enumerating a number of congestion events comprising load data that exceeds a threshold load.

19. A non-transitory machine-readable medium, comprising executable instructions that, when executed by a processor, facilitate performance of operations, comprising:
determining a predictive throughput indicator based on a statistical function associated with a distribution of a cluster of a first delay and a second delay around an estimator, wherein the first delay and the second delay are respective delays experienced by a communication packet; and
scheduling a transmission of streaming content to a device via first network equipment or via second network equipment based on the predictive throughput indicator, wherein the scheduling is based on mitigation of a third delay during the transmission of the streaming content.

20. The non-transitory machine-readable storage medium of claim 19, wherein the first delay is experienced based on the communication packet being sent to the first network equipment, and wherein the second delay is experienced based on the communication packet being sent to the second network equipment via the first network equipment.

* * * * *